(12) United States Patent
Kouchi (10) Patent No.: US 9,457,840 B2
(45) Date of Patent: Oct. 4, 2016

(54) VEHICLE STEERING SYSTEM

(71) Applicant: JTEKT CORPORATION, Osaka-shi, Osaka (JP)

(72) Inventor: Tatsuma Kouchi, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 29 days.

(21) Appl. No.: 14/221,594

(22) Filed: Mar. 21, 2014

(65) Prior Publication Data

US 2014/0297122 A1 Oct. 2, 2014

(30) Foreign Application Priority Data

Mar. 28, 2013 (JP) ................................. 2013-070552

(51) Int. Cl.
*B62D 6/06* (2006.01)
*B62D 6/04* (2006.01)
*B62D 5/04* (2006.01)

(52) U.S. Cl.
CPC ............... *B62D 6/06* (2013.01); *B62D 5/0472* (2013.01); *B62D 6/04* (2013.01)

(58) Field of Classification Search
CPC ......... B62D 5/0472; B62D 6/04; B62D 6/06
See application file for complete search history.

(56) References Cited

U.S. PATENT DOCUMENTS

| 6,092,028 | A * | 7/2000 | Naito | B60C 23/061 702/138 |
|---|---|---|---|---|
| 6,250,421 | B1 | 6/2001 | Poshadlo | |
| 7,032,436 | B2 * | 4/2006 | Yokota | B60C 23/06 73/114.76 |
| 7,205,886 | B2 * | 4/2007 | Kin | B60C 23/061 73/146.2 |
| 7,970,516 | B2 * | 6/2011 | Matsumoto et al. | 701/37 |
| 8,082,081 | B2 * | 12/2011 | Matsumoto et al. | 701/48 |
| 8,744,682 | B2 * | 6/2014 | Oblizajek | B62D 5/0472 701/41 |
| 2004/0102880 | A1 * | 5/2004 | Brown | 701/29 |
| 2005/0049761 | A1 * | 3/2005 | Kataoka et al. | 701/1 |
| 2008/0066991 | A1 | 3/2008 | Kataoka et al. | |
| 2009/0139327 | A1 * | 6/2009 | Dagh | G01M 1/225 73/457 |
| 2009/0294206 | A1 * | 12/2009 | Oblizajek | B62D 5/0472 701/41 |
| 2012/0179332 | A1 * | 7/2012 | Harima | F02D 41/1498 701/37 |

FOREIGN PATENT DOCUMENTS

| DE | 10 2005 051 442 A1 | 5/2007 |
|---|---|---|
| DE | 10 2007 044 756 A1 | 4/2009 |

(Continued)

OTHER PUBLICATIONS

Goodeve, Thomas Minchin, Principles of Mechanics, 1891, Longmans, Green, and Co., New Edition, Cover page, publishing page and pp. 10 thru 14.*

(Continued)

*Primary Examiner* — Dale W Hilgendorf
(74) *Attorney, Agent, or Firm* — Oliff PLC (57) ABSTRACT

A vehicle steering system includes an axial force sensor that detects a vibration of a vehicle wheel; and a control device including an FFT analysis unit that resolves the vibration of the vehicle wheel into a power spectrum. The control device executes compensation assist control that suppresses one of a deflection of the vehicle and a vibration of a steering component that are caused by a puncture or a burst of the vehicle wheel, based on the vibration calculated based on a radius of the vehicle wheel when the vehicle wheel is normal and a vehicle speed and an abnormal-wheel frequency calculated based on a radius of the vehicle wheel when the vehicle wheel is punctured or burst and the vehicle speed.

6 Claims, 6 Drawing Sheets

(56) References Cited

FOREIGN PATENT DOCUMENTS

| | | |
|---|---|---|
| JP | 2004-161073 | 6/2004 |
| JP | A-2009-184627 | 8/2009 |

OTHER PUBLICATIONS

Jun. 10, 2014 Extended European Search Report issued in European Application No. 14 16 1441.2.

* cited by examiner

VEHICLE STEERING SYSTEM

INCORPORATION BY REFERENCE

The disclosure of Japanese Patent Application No. 2013-070552 filed on Mar. 28, 2013 including the specification, drawings and abstract is incorporated herein by reference in its entirety.

BACKGROUND OF THE INVENTION

1. Field of the Invention

The present invention relates to a vehicle steering system including a sensor that detects a vibration of a vehicle wheel of a vehicle.

2. Description of Related Art

In vehicle steering systems in related art, multiple sampling of a vibration level of a vehicle wheel during one rotation of the vehicle wheel is repeated over multiple rotations of the wheel, and thus, the vibration level of the vehicle wheel over multiple rotations of the vehicle wheel is detected. In the vehicle steering system, a vibration level sum value at each sampling position is calculated by summing the vibration level at the sampling position during each number of rotations of the vehicle wheel. In the vehicle steering system, a sampling position, at which the vibration level sum value exceeds a predetermined value, is determined, that is, a vehicle wheel region, in which the vehicle wheel is abnormal, is determined. Japanese Patent Application Publication No. 2009-184627 describes an example of the vehicle steering system in the related art.

In the vehicle steering systems in the related art, it is possible to determine a region of a vehicle wheel, in which abnormality occurs, but it is difficult to determine whether the abnormality is attributable to a tire of the vehicle wheel being punctured or burst.

SUMMARY OF THE INVENTION

An object of the invention is to provide a vehicle steering system in which it is possible to more accurately detect occurrence of a puncture or a burst of a vehicle wheel.

A vehicle steering system according to an aspect of the invention includes a sensor that detects a vibration of a vehicle wheel of a vehicle; and a control device including a frequency analysis unit that resolves the vibration of the vehicle wheel detected by the sensor into a power spectrum at each predetermined frequency. The control device executes compensation assist control that suppresses at least one of a deflection of the vehicle and a vibration of a steering component of the vehicle that are caused by a puncture or a burst of the vehicle wheel, based on the vibration of the vehicle wheel that occurs in a specific frequency domain formed by a frequency range between a normal-wheel frequency calculated based on a radius of the vehicle wheel when the vehicle wheel is normal and a traveling speed of the vehicle and an abnormal-wheel frequency calculated based on a radius of the vehicle wheel when the vehicle wheel is punctured or burst and the traveling speed.

The vibration of the vehicle wheel due to a kickback from a road surface may be different from the vibration of the vehicle wheel that occurs when the vehicle wheel is punctured or burst. That is, a frequency, at which the power spectrum of the vibration of the vehicle wheel due to the kickback becomes maximum, may be outside the specific frequency domain.

In the above-mentioned vehicle steering system, the compensation assist control is executed based on the vibration of the vehicle wheel that occurs in the specific frequency domain. Therefore, in the vehicle steering system, it is possible to avoid a situation where the compensation assist control is executed based on the kickback outside the specific frequency domain. Accordingly, in the vehicle steering system, it is possible to more accurately detect the occurrence of the puncture or burst of the vehicle wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
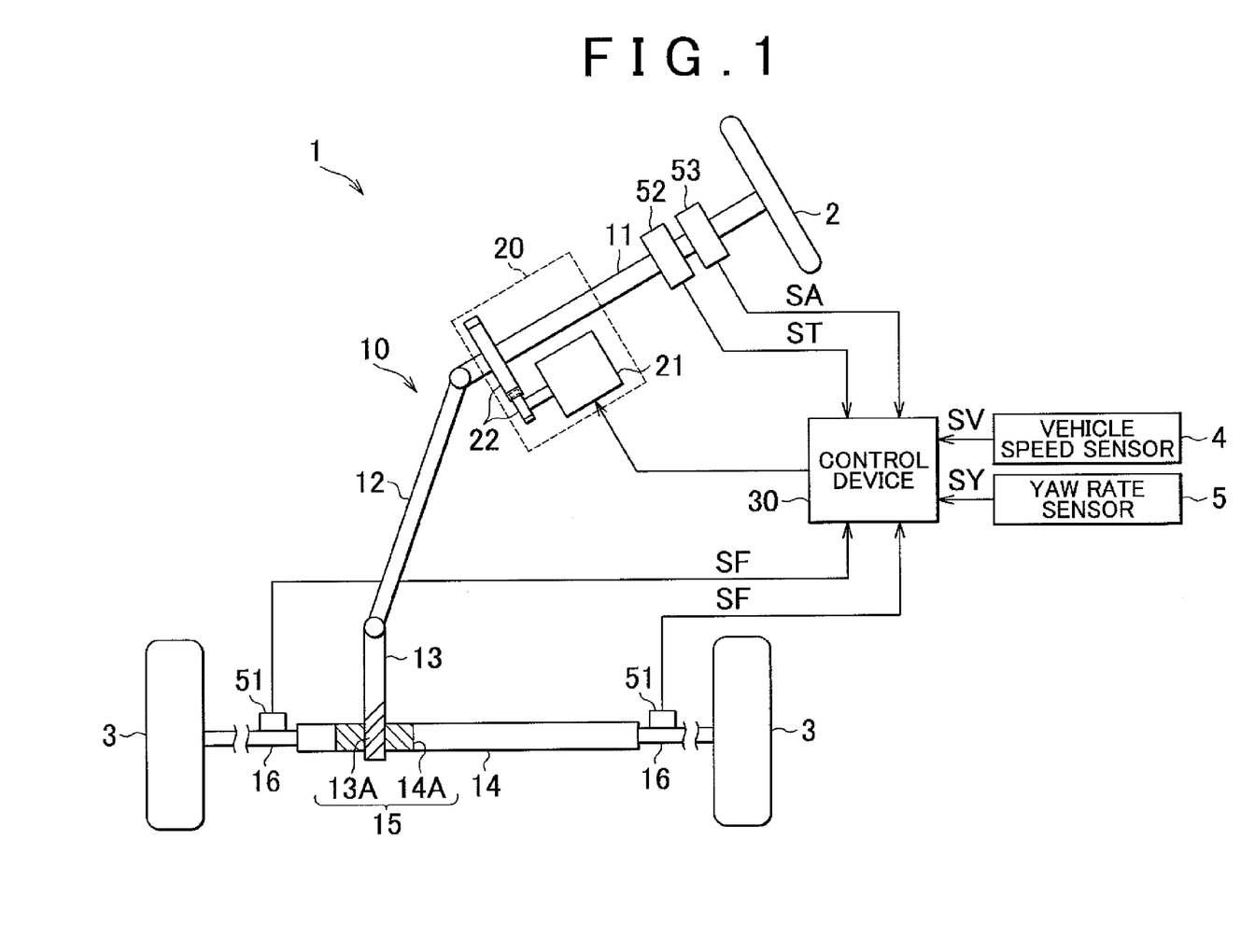
FIG. 1 is a configuration diagram of a vehicle steering system according to an embodiment.

The configuration of a vehicle steering system 1 will be described with reference to FIG. 1. The vehicle steering system 1 includes a steering system main body 10, an assist device 20, a control device 30, two axial force sensors 51, a torque sensor 52, and a steering sensor 53. The vehicle steering system 1 is configured as a column assist type electric power steering system in which the steering of a steering component 2 is assisted by the assist device 20.

The steering system main body 10 includes a column shaft 11, an intermediate shaft 12, a pinion shaft 13, a rack shaft 14, a rack and pinion mechanism 15, and tie rods 16. The steering system main body 10 changes a steered angle of wheels 3 on the basis of an operation of the steering component 2.

The rack and pinion mechanism 15 includes pinion teeth 13A of the pinion shaft 13 and rack teeth 14A of the rack shaft 14. The rack and pinion mechanism 15 converts the rotation of the pinion shaft 13 to the reciprocating motion of the rack shaft 14 in the axial direction of the rack shaft 14.

The assist device 20 includes an assist motor 21 that is a three-phase brushless motor, and a speed reducing mechanism 22 that is a worth gear mechanism. The assist device 20 is connected to the column shaft 11. The assist device 20 transmits a rotation of an output shaft of the assist motor 21 to the column shaft 11 in a state where the rotational speed of the output shaft of the assist motor 21 is reduced by the speed reducing mechanism 22. The assist device 20 applies a rotational torque of the output shaft of the assist motor 21 to the column shaft 11, as a force (hereinafter, called the assist force) for assisting the rotation of the column shaft 11.

Each axial force sensor 51 detects a force (hereinafter, called an axial force) that is applied to the corresponding tie rod 16 in the axial direction of the tie rod 16. Each axial force sensor 51 is able to detect a vibration of the corresponding vehicle wheel 3 through the axial force. Each axial force sensor 51 outputs a signal according to the axial force (hereinafter, called the axial force signal SF) to the control device 30. The axial force sensor 51 corresponds to a sensor.

The torque sensor 52 detects a torque (hereinafter, called the steering torque) that is applied to the column shaft 11 when the steering component 2 is rotated. The torque sensor 52 outputs a signal according to the steering torque (hereinafter, called the torque signal ST) to the control device 30.

The steering sensor 53 detects a rotation angle (hereinafter, called the steering angle) of the column shaft 11 associated with the rotating operation of the steering component 2. The steering sensor 53 outputs a signal according to the steering angle (hereinafter, called the steering angle signal SA) to the control device 30.

A vehicle speed sensor 4 and a yaw rate sensor 5 are electrically connected to the control device 30. The vehicle speed sensor 4 detects a traveling speed of the vehicle (hereinafter, called the vehicle speed V). The vehicle speed sensor 4 outputs a signal according to the vehicle speed V (hereinafter, called the vehicle speed signal SV) to the control device 30. The yaw rate sensor 5 detects a yaw rate which is an angular velocity of the rotation of the vehicle around an axis parallel to a vertical direction, that is, around a yaw axis. The yaw rate sensor 5 outputs a signal according to the yaw rate (hereinafter, called the yaw rate signal SY) to the control device 30.

The control device 30 controls an operation of the vehicle steering system 1. The control device 30 includes a basic assist control unit and a compensation assist control unit. When a tire 3A (see A portion, B portion, and C portion of FIG. 3) of the vehicle wheel 3 is not punctured (flattened) or burst and thus the vehicle wheel 3 is normal, the basic assist control unit causes the assist motor 21 to generate the assist force associated with the operation of the steering component 2. When the tire 3A of the vehicle wheel 3 is punctured or burst and thus the vehicle wheel 3 is abnormal, the compensation assist control unit causes the assist motor 21 to generate an assist force obtained by compensating for the assist force to be generated in accordance with a command from the basic assist control unit.

The operation of the vehicle steering system 1 will be described below. In the steering system main body 10, the column shaft 11, the intermediate shaft 12, and the pinion shaft 13 are rotated together due to the rotating operation of the steering component 2. In the steering system main body 10, the rack and pinion mechanism 15 converts the rotation of the pinion shaft 13 to the reciprocating motion of the rack shaft 14. In the steering system main body 10, the steered angle of the wheels 3 is changed through the tie rods 16 due to the reciprocating motion of the rack shaft 14.

Figure 2:
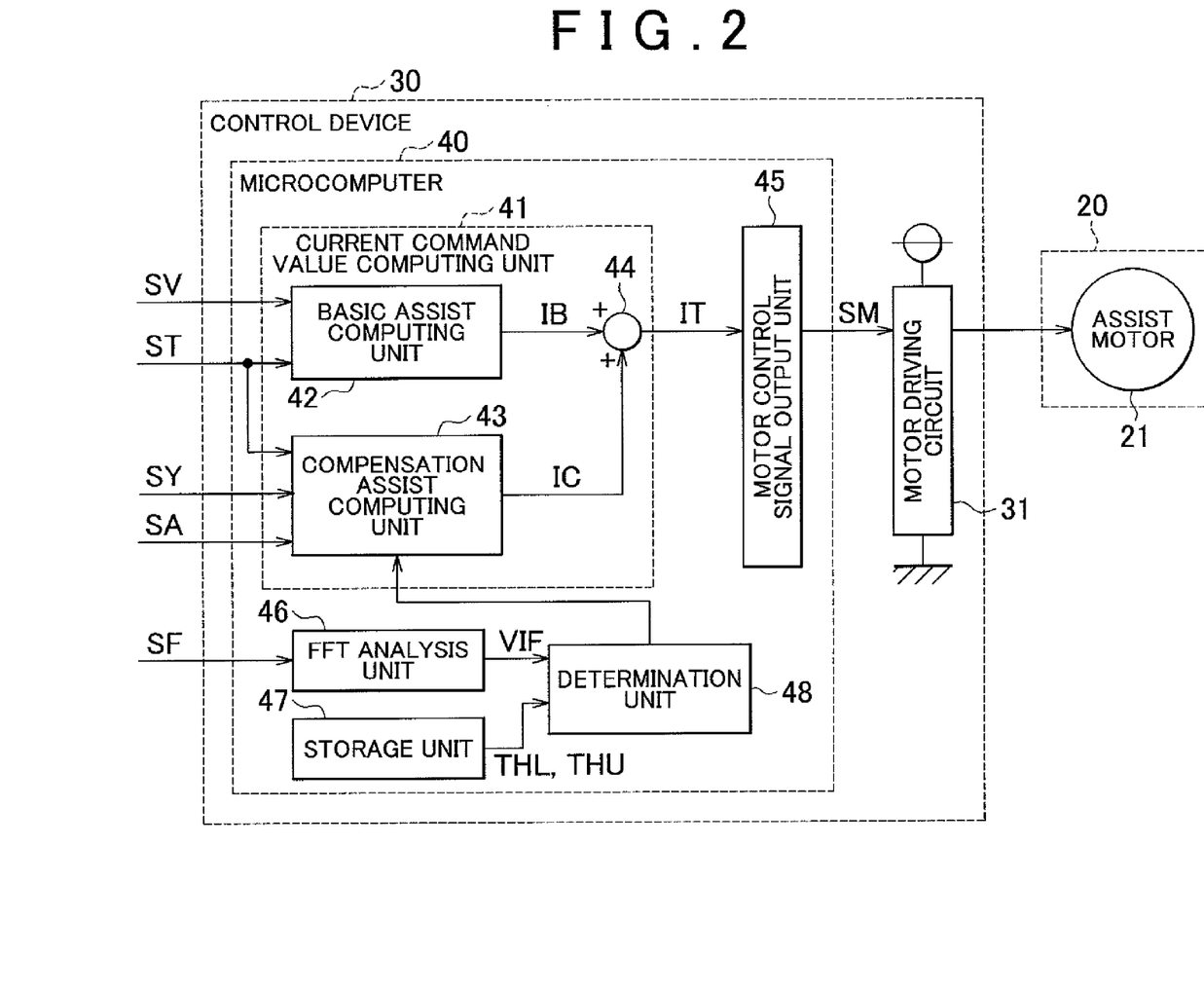
FIG. 2 is a block diagram showing a control device in the embodiment.

The detailed configuration of the control device 30 will be described below with reference to FIG. 2. The control device 30 includes a microcomputer 40 and a motor driving circuit 31. The microcomputer 40 outputs a motor control signal SM for controlling an operation of the motor driving circuit 31 to the motor driving circuit 31. The motor driving circuit 31 includes a plurality of field effect transistors (FETs). The motor driving circuit 31 controls an operation for switching the state of each FET between the on state and off state, on the basis of the motor control signal SM.

The microcomputer 40 includes a current command value computing unit 41, a motor control signal output unit 45, an FFT analysis unit 46, a storage unit 47, and a determination unit 48. The FFT analysis unit 46 corresponds to a frequency analysis unit.

The current command value computing unit 41 includes a basic assist computing unit 42, a compensation assist computing unit 43, and an adder 44. The current command value computing unit 41 computes a target value of electric power supplied to the assist motor 21, that is, a current command value according to a target assist force (hereinafter, called a current command value IT).

The vehicle speed signal SV and the torque signal ST are input to the basic assist computing unit 42. The basic assist computing unit 42 computes a basic assist controlled variable IB, as a basic control component corresponding to the target assist force on the basis of the vehicle speed signal SV and the torque signal ST. The basic assist computing unit 42 computes the basic assist controlled variable IB so that the absolute value of the basic assist controlled variable IB increases as the absolute value of the steering torque increases, and as the vehicle speed V decreases. The basic assist computing unit 42 outputs the basic assist controlled variable IB to the adder 44.

The steering angle signal SA, the torque signal ST, and the yaw rate signal SY are input to the compensation assist computing unit 43. The compensation assist computing unit 43 computes a compensation assist controlled variable IC when the tire 3A of the vehicle wheel 3 is punctured or burst. The compensation assist computing unit 43 outputs the compensation assist controlled variable IC to the adder 44.

The adder 44 calculates a controlled variable that is the sum of the basic assist controlled variable IB and the compensation assist controlled variable IC, as the current command value IT. The motor control signal output unit 45 executes current feedback control so that an actual current value supplied to the assist motor 21 coincides with the current command value IT computed by the current command value computing unit 41. Thus, the motor control signal output unit 45 outputs the motor control signal SM to the motor driving circuit 31.

The axial force signal SF is input to the FFT analysis unit 46. The FFT analysis unit 46 resolves the axial force into a power spectrum for each frequency at a predetermined resolution through fast Fourier transform (FFT). The FFT analysis unit 46 calculates an integrated value of the power spectrum of the axial force (hereinafter, called an axial force integrated value VIF) in the entire specific frequency domain FRP. The FFT analysis unit outputs the axial force integrated value VIF to the determination unit 48.

The storage unit 47 stores the specific frequency domain FRP according to the vehicle speed V, and an upper limit threshold THU and a lower limit threshold THL for making a determination as to the puncture or burst of the tire 3A of the vehicle wheel 3. The storage unit 47 outputs the specific frequency domain FRP, the upper limit threshold THU, and the lower limit threshold THL to the determination unit 48.

The determination unit 48 determines whether to add the compensation assist controlled variable IC of the compensation assist computing unit 43 to the adder 44, on the basis of the comparison of the axial force integrated value VIF with the upper limit threshold THU and the lower limit threshold THL.

The contents of control for the operation of the vehicle steering system 1 executed by the control device 30 will be described below. The control device 30 executes basic assist control and compensation assist control. When the determination unit 48 determines that the compensation assist controlled variable IC should not be added to the adder 44, the control device 30 executes the basic assist control. When the determination unit 48 determines that the compensation assist controlled variable IC should be added to the adder 44, the control device 30 executes the compensation assist control.

In the basic assist control, in the control device 30, the basic assist controlled variable IB is output to the motor control signal output unit 45, as the current command value IT. In the control device 30, the motor control signal output unit 45 outputs the motor control signal SM based on the current command value IT as the basic assist controlled variable IB, to the motor driving circuit 31.

In the compensation assist control, the control device 30 executes vibration torque suppression control and deflection suppression control. The control device 30 executes the vibration torque suppression control when a force (hereinafter, called the vibration torque) for vibrating the steering component 2 is applied to the steering component 2 (see FIG. 1) due to the tire 3A being punctured or burst. The control device 30 executes the deflection suppression control when the vehicle is deflected due to the tire 3A being punctured or burst. The control device 30 outputs the sum of the basic assist controlled variable IB and the compensation assist controlled variable IC to the motor control signal output unit 45, as the current command value IT, on the basis of the vibration torque suppression control and the deflection suppression control. The control device 30 outputs the motor control signal SM based on the current command value IT as the sum of the basic assist controlled variable IB and the compensation assist controlled variable IC, to the motor driving circuit 31.

In the vibration torque suppression control, the compensation assist controlled variable IC computed by the compensation assist computing unit 43 on the basis of the torque signal ST is output to the adder 44. The compensation assist computing unit 43 computes the compensation assist controlled variable IC for suppressing the vibration torque by executing feedback of a deviation between a steering torque increased due to the vibration torque and a target steering torque. In this manner, the compensation assist controlled variable IC indicates a current command value for generating a steering torque so that an amount, by which the steering torque is increased due to the vibration torque, is made equal to zero.

In the deflection suppression control, the compensation assist controlled variable IC computed by the compensation assist computing unit 43 on the basis of the steering angle signal SA, the vehicle speed signal SV, and the yaw rate signal SY is output to the adder 44. The compensation assist controlled variable IC is computed as an assist force required for bringing the vehicle from a deflected state to a straight traveling state, that is, required for bringing the steering component 2 to a neutral position. The compensation assist computing unit 43 computes the compensation assist controlled variable IC so that the absolute value of the compensation assist controlled variable IC increases as the absolute value of the steering angle increases, and as the vehicle speed V decreases.

The control device 30 executes the vibration torque suppression control and the deflection suppression control together, when the vibration torque is applied to the steering component 2 and the vehicle is deflected due to the tire 3A being punctured or burst. In the control device 30, the compensation assist computing unit 43 computes the compensation assist controlled variable IC on the basis of the compensation assist controlled variable IC for suppressing the vibration torque and the compensation assist controlled variable for suppressing the deflection of the vehicle.

Figure 3:
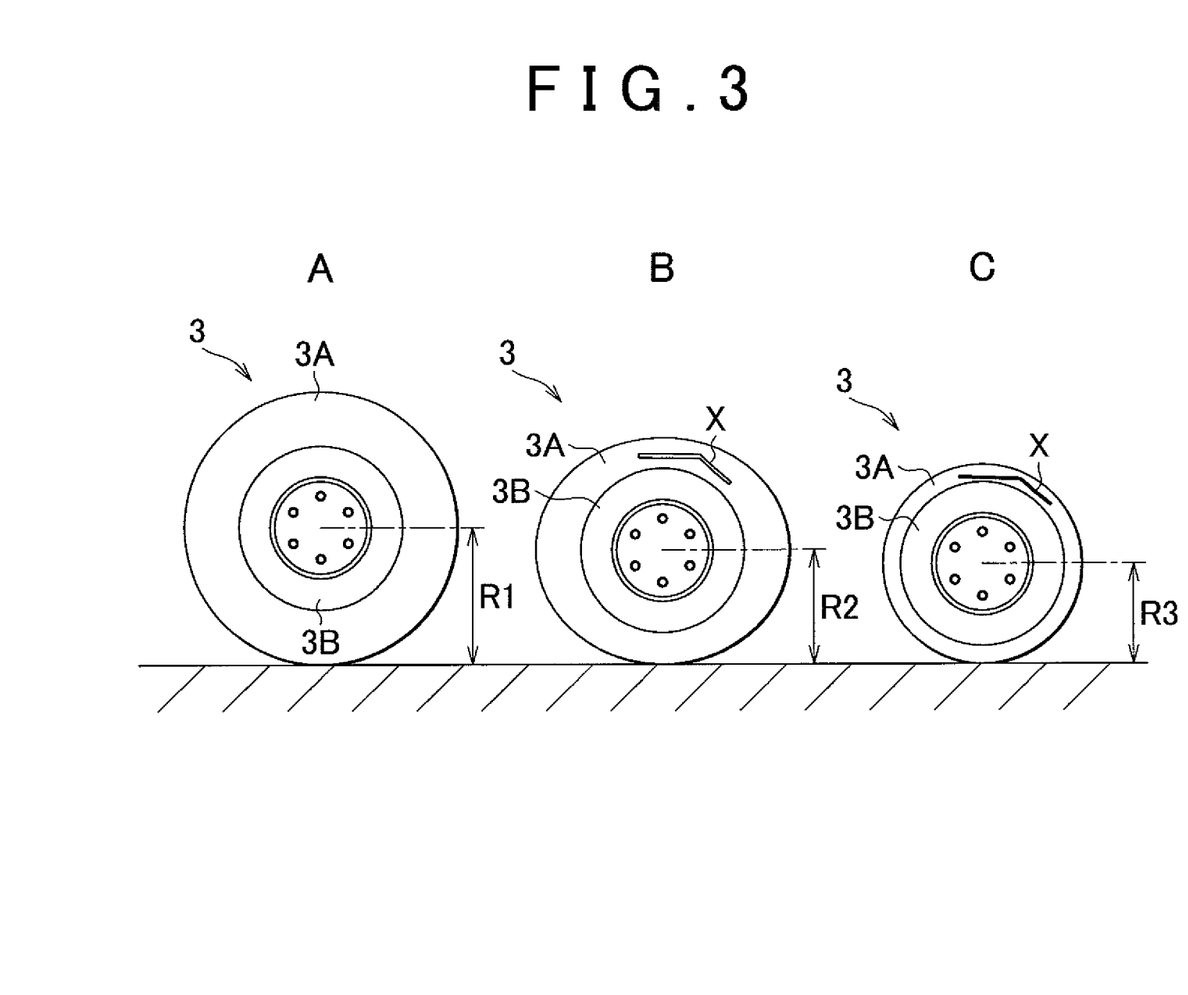
FIG. 3 is a side view of a vehicle wheel of a vehicle in the embodiment.

A method of detecting the generation of the puncture or burst of the tire 3A will be described below with reference to FIGS. 3 and 4. As shown in the B portion of FIG. 3, when the tire 3A is punctured or burst, a radius R2 of the vehicle wheel 3 has a size between a radius R1 of the vehicle wheel 3 when the vehicle wheel 3 is normal as shown in the A portion of FIG. 3 and a radius R3 of the vehicle wheel 3 when the tire 3A is punctured or burst and all the air of the tire 3A is discharged as shown in the C portion of FIG. 3 (R3<R2<R1). The radius R3 of the vehicle wheel 3 shown in the C portion of FIG. 3 is equal to the sum of the radius of a wheel 3B and the thickness of the tire 3A.

When the tire 3A is punctured or burst, the tire 3A is made uneven by a portion that has a burst portion X and a portion that does not have the burst portion X. Therefore, when the vehicle wheel 3 rotates, a vibration is applied to the tie rod 16 (see FIG. 1) depending on the uneven shape of the tire 3A. For example, when one burst portion X is present in the tire 3A, that is, when one recessed portion is present in the tire 3A, the recessed portion contacts the ground once during one rotation of the vehicle wheel 3. In this case, a vibration is applied to the tie rod 16 through the vehicle wheel 3.

A vibration frequency FQ2 corresponding to a vibration period is represented by the following Expression (1). V denotes a vehicle speed.

$$FQ2 = V/2\pi R2 \quad (1)$$

Figure 4:
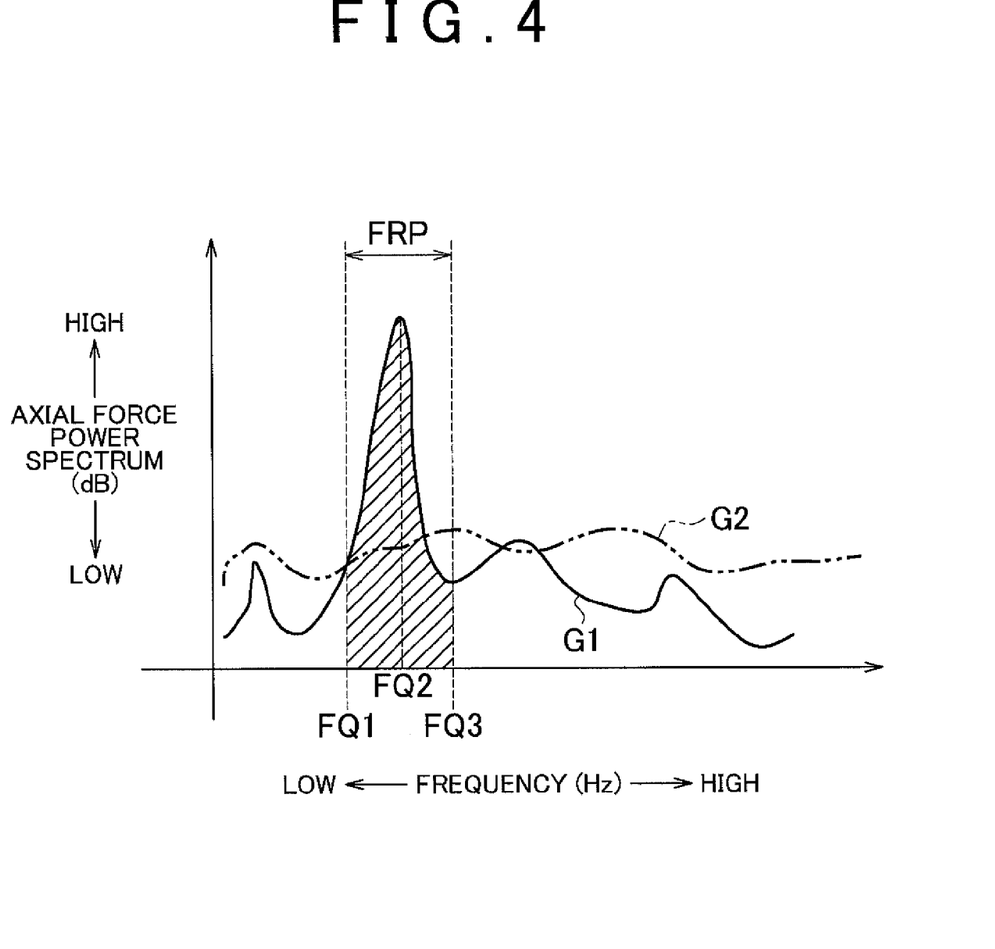
FIG. 4 is a graph showing a relation between a frequency and a power spectrum of an axial force in the embodiment.

As shown in a graph G2 indicated by a dashed-two dotted line in FIG. 4, when the vehicle wheel 3 is normal, the vibration associated with the rotation of the vehicle wheel 3 is small. In addition, graphs G1 and G2 of FIG. 4 show vibrations of the tie rod 16, that is, vibrations of the vehicle wheel 3 detected by the axial force sensor 51 when the vehicle wheel 3 rotates on a road surface paved with asphalt or the like, which has little unevenness as compared to a rough road, such as a gravel road, which has much unevenness.

As shown in the graph G1 indicated by a solid line in FIG. 4, when the puncture or burst of the tire 3A occurs, the power spectrum of the axial force at the vibration frequency FQ2 is significantly higher than that in the vibration of the vehicle wheel 3 when the vehicle wheel 3 is normal.

The vibration frequency FQ2 is present between a vibration period (hereinafter, called a normal-wheel frequency FQ1) when the vehicle wheel 3 is normal and a vibration period (hereinafter, called an abnormal-wheel frequency FQ3) when the tire 3A is punctured or burst and all the air of the tire 3A is discharged (FQ1<FQ2<FQ3).

The normal-wheel frequency FQ1 and the abnormal-wheel frequency FQ3 are represented by the following Expressions (2) and (3).

$$FQ1 = V/2\pi R1 \quad (2)$$

$$FQ3 = V/2\pi R3 \quad (3)$$

When the tire 3A is punctured or burst, the power spectrum of the axial force, which is significantly higher than the power spectrum of the axial force when the vehicle wheel 3 is normal, occurs in the specific frequency domain FRP that is formed by a frequency range from the normal-wheel frequency FQ1 to the abnormal-wheel frequency FQ3. Therefore, it is possible to detect the occurrence of the puncture or burst of the tire 3A by analyzing the vibration within the specific frequency domain FRP.

The control device 30 of this embodiment detects the occurrence of the puncture or burst of the tire 3A, on the basis of the magnitude of the power spectrum of the axial force within the specific frequency domain FRP. The control device 30 includes assist selection control of executing the compensation assist control when the tire 3A is punctured or burst. In the assist selection control, when it is determined that the tire 3A is not punctured or burst, the basic assist control is executed instead of the compensation assist control. The specific frequency domain FRP changes according to the vehicle speed V as shown in Expressions (2), (3). Specifically, the specific frequency domain FRP transitions to a region having higher frequencies as the vehicle speed V increases.

Figure 5:
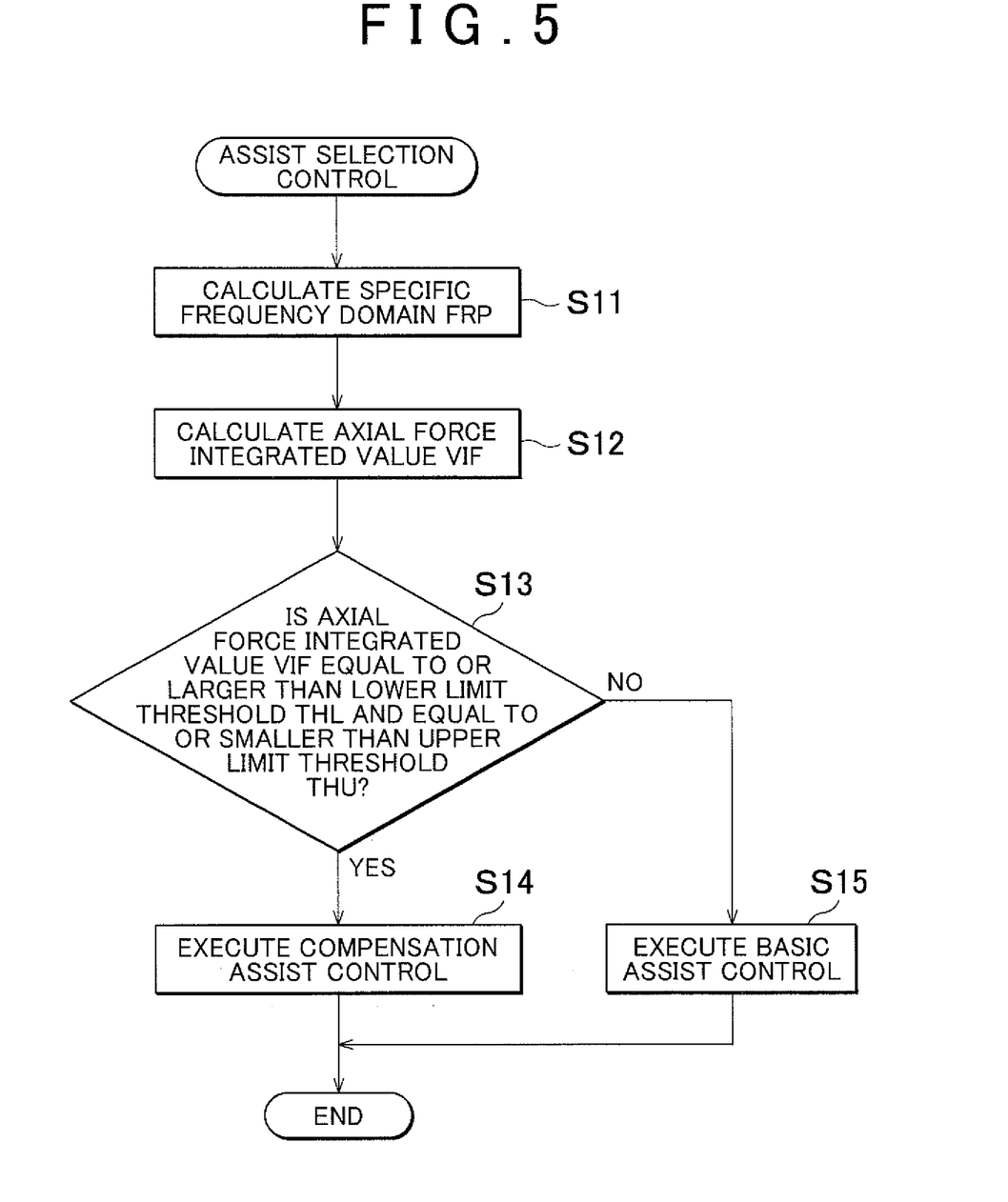
FIG. 5 is a flowchart showing a procedure of assist selection control executed by the control device in the embodiment.

A procedure of the assist selection control will be described below with reference to FIG. 5. The control device 30 repeatedly executes the assist selection control at intervals of a predetermined time. In the following description referring to FIG. 5, components of the vehicle steering system 1, to which reference numerals and signs are assigned, are the components shown in FIGS. 1 and 2.

In step S11, the control device 30 calculates the specific frequency domain FRP. The control device 30 calculates the normal-wheel frequency FQ1 and the abnormal-wheel frequency FQ3 according to the vehicle speed V by substituting the vehicle speed V at each time point into Expressions (2) and (3). The control device 30 calculates a range equal to or higher than the normal-wheel frequency FQ1 and equal to or lower than the abnormal-wheel frequency FQ3 as the specific frequency domain FRP according to the vehicle speed V.

In step S12, the control device 30 calculates the axial force integrated value VIF. The axial force integrated value VIF shows, for example, the area of a shaded region in the graph shown in FIG. 4. The control device 30 calculates the axial force integrated value VIF by integrating the power spectrum of the axial force indicated by the FFT analysis unit 46 over the entire specific frequency domain FRP.

In step S13, the control device 30 determines whether the axial force integrated value VIF is in a range equal to or larger than the lower limit threshold THL and equal to or smaller than the upper limit threshold THU. The upper limit threshold THU and the lower limit threshold THL are the upper limit and the lower limit, respectively, of the axial force integrated value VIF when the tire 3A is punctured or burst. The upper limit threshold THU and the lower limit threshold THL are preset by an experiment or the like.

When an affirmative determination is made in step S13, that is, when it is determined that the tire 3A is punctured or burst, the control device 30 executes the compensation assist control in step S14. When a negative determination is made in step S13, that is, when it is determined that the tire 3A is not punctured or burst, the control device 30 executes the basic assist control in step S15.

The effects of the vehicle steering system 1 according to this embodiment will be described below. A virtual steering system refers to a vehicle steering system in which the compensation assist control is assumed to be executed in response to a force, such as a kickback, which is instantaneously applied to the vehicle wheel 3.

In the virtual steering system, the compensation assist control unit detects a fluctuation in the steering torque due to the kickback and then calculates a controlled variable by using the feedback control. Therefore, the compensation assist control is executed after the kickback. For this reason, in spite of the kickback disappearing and the vibration not being generated in the steering component, the steering component is operated through the compensation assist control while a driver operates the steering component. Thus, steering assist is provided in a manner unintended by the driver, and thus a steering feeling deteriorates.

In contrast, in the vehicle steering system 1 of this embodiment, the compensation assist control is executed by the assist selection control on the basis of the power spectrum of the axial force within the specific frequency domain FRP. Specifically, in the vehicle steering system 1, the compensation assist control is not executed when a frequency corresponding to the maximum value of the power spectrum of the axial force due to the kickback is outside the specific frequency domain FRP. Thus, in the vehicle steering system 1, it is possible to distinguish between the vibration of the vehicle wheel 3 caused by the kickback and the vibration of the vehicle wheel 3 caused by the puncture or burst of the tire 3A. In the vehicle steering system 1 of this embodiment, it is possible to detect the vibration of the vehicle wheel 3 caused by the puncture or burst of the tire 3A more accurately than in the virtual steering system. Therefore, the execution of the compensation assist control due to the kickback is avoided. Deterioration in a steering feeling is suppressed as compared to the virtual steering system.

When the frequency corresponding to the maximum value of the power spectrum of the axial force due to the kickback falls within the specific frequency domain FRP, there is a possibility that the vibration of the vehicle wheel 3 due to the kickback may be confused with the vibration of the vehicle wheel 3 due to the occurrence of the puncture or burst of the tire 3A.

However, the waveform of the vibration due to the kickback and the waveform of the vibration due to the puncture or burst of the tire 3A are different from each other. In the vehicle steering system 1 of this embodiment, it is determined whether the tire 3A is punctured or burst, on the basis of whether the axial force integrated value VIF within the specific frequency domain FRP is equal to or larger than the lower limit threshold THL and equal to or smaller than the upper limit threshold THU. Thus, in the vehicle steering system 1, it is possible to detect the vibration of the vehicle wheel 3 due to the occurrence of the puncture or burst of the tire 3A even when the frequency corresponding to the maximum value of the power spectrum of the axial force due to the kickback falls within the specific frequency domain FRP.

The vehicle steering system 1 of this embodiment has the following effects. In the vehicle steering system 1, the compensation assist control is executed on the basis of the power spectrum of the axial force within the specific frequency domain FRP. According to this configuration, it is possible to detect the occurrence of the puncture or burst of the tire 3A more accurately than in the virtual steering system. In addition, the execution of the compensation assist control is suppressed when the kickback occurs such that the power spectrum of the axial force becomes maximum at a frequency outside the specific frequency domain FRP. Therefore, deterioration in a steering feeling is suppressed as compared to the virtual steering system.

In the vehicle steering system 1, the compensation assist control is executed on the basis of the comparison of the axial force integrated value VIF with the upper limit threshold THU and the lower limit threshold THL. According to this configuration, it is possible to distinguish between the kickback and the occurrence of the puncture or burst of the tire 3A even when the kickback having a frequency within the specific frequency domain FRP occurs. Therefore, it is possible to detect the occurrence of the puncture or burst of the tire 3A more accurately.

The vehicle steering system includes embodiments other than the above-mentioned embodiment. Hereinafter, modified examples of the above-mentioned embodiment as the other embodiments of the vehicle steering system will be described. The following modified examples may be combined with each other.

In the assist selection control, the control device 30 of the embodiment determines whether the tire 3A is punctured or burst, on the basis of the axial force integrated value VIF that is an integrated value of the axial force power spectrum within the specific frequency domain FRP. However, the determination as to whether the tire 3A is punctured or burst is not limited to the determination exemplified in the embodiment. For example, the control device 30 of a modified example determines whether the tire 3A is punctured or burst, on the basis of one of the following method A1 and method A2.

Figure 6:
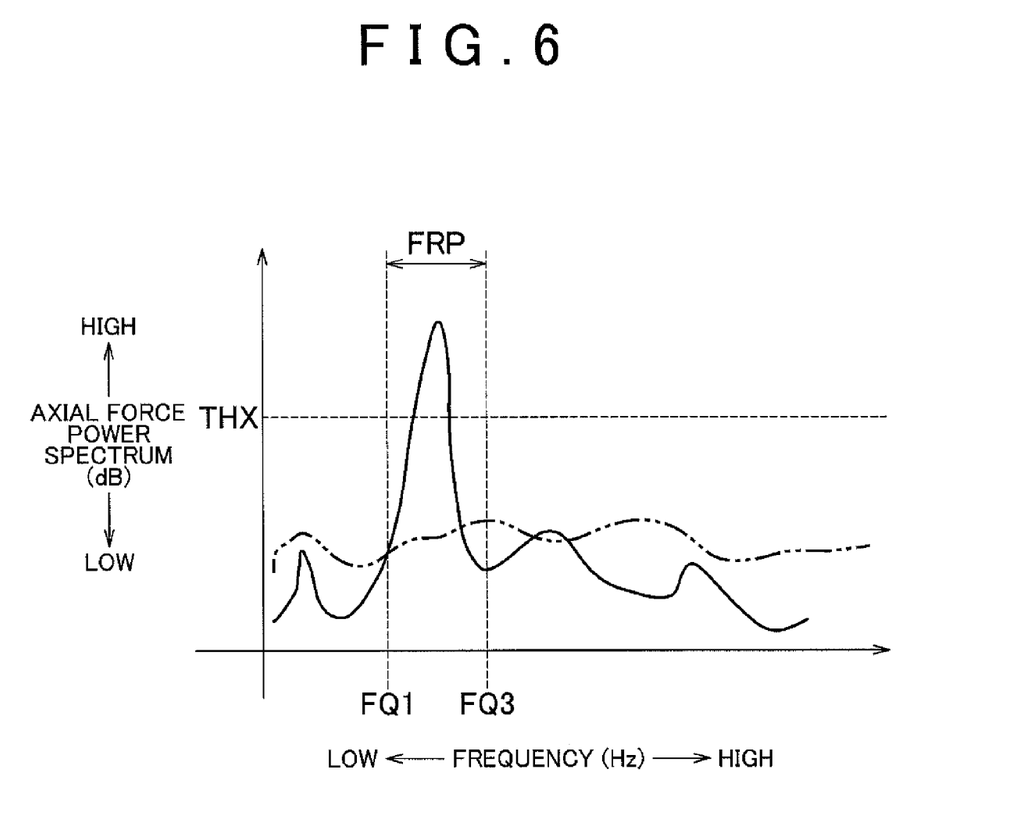
FIG. 6 is a graph showing the relation between the frequency and the power spectrum of the axial force in a vehicle steering system according to another embodiment.

Method A1: as shown in FIG. 6, the control device 30 of a modified example determines whether the tire 3A is punctured or burst, on the basis of the maximum value of the power spectrum of the axial force within the specific frequency domain FRP and a threshold THX that is preset. Specifically, when the maximum value of the power spectrum of the axial force is equal to or larger than the threshold THX, it is determined that the tire 3A is punctured or burst. The threshold THX is the lower limit value of the power spectrum of the axial force within the specific frequency domain FRP when the tire 3A is punctured or burst. The threshold THX is preset by an experiment or the like.

Method A2: the control device 30 of a modified example compares the waveform of the power spectrum of the axial force within the specific frequency domain FRP with the waveform of the power spectrum of the axial force at the time of the puncture or burst of the tire 3A, which is stored in the storage unit. When the degree of coincidence in the comparison between the waveforms is equal to or larger than a threshold, the control device 30 of the modified example determines that the waveform of the power spectrum of the axial force within the specific frequency domain FRP is coincident with the waveform of the power spectrum of the axial force at the time of the puncture or burst of the tire 3A, which is stored in the storage unit. That is, the control device 30 of the modified example determines that the tire 3A is punctured or burst. The waveform of the power spectrum of the axial force at the time of the puncture or burst of the tire 3A is shown as an average waveform of a plurality of waveforms acquired in advance by an experiment or the like. In addition, the threshold is set to the lowest degree of coincidence among the degrees of coincidence between the waveforms acquired in advance by an experiment or the like and the above-mentioned average waveform.

The control device 30 of the embodiment calculates the specific frequency domain FRP as a range equal to or higher than the normal-wheel frequency FQ1 and equal to or lower than the abnormal-wheel frequency FQ3. However, a method of calculating the specific frequency domain FRP is not limited to the method exemplified in the embodiment. For example, the control device 30 of a modified example calculates the specific frequency domain FRP on the basis of one of the following method B1 to method B4. Method B1: the specific frequency domain FRP of the modified example is calculated as a range (FQ1<FRP≤FQ3) that is higher than the normal-wheel frequency FQ1 and equal to or lower than the abnormal-wheel frequency FQ3. Method B2: the specific frequency domain FRP of the modified example is calculated as a range (FQ1≤FRP<FQ3) that is equal to or higher than the normal-wheel frequency FQ1 and lower than the abnormal-wheel frequency FQ3. Method B3: the specific frequency domain FRP of the modified example is calculated as a range (FQ1<FRP<FQ3) that is higher than the normal-wheel frequency FQ1 and lower than the abnormal-wheel frequency FQ3. Method B4: the specific frequency domain FRP of the modified example is calculated as a specific frequency domain within a range from the normal-wheel frequency FQ1 to the abnormal-wheel frequency FQ3.

The control device 30 of the embodiment detects the vibration of the tire 3A by using the axial force sensor 51. However, the detection of the vibration of the tire 3A is not limited to the detection exemplified in the embodiment. For example, the control device 30 of the modified example detects the vibration of the tire 3A using one of the following method C1 to method C4 instead of the axial force sensor 51. Method C1: the control device 30 of the modified example detects the vibration of the tire 3A by using the torque sensor 52. Method C2: the control device 30 of the modified example detects the vibration of the tire 3A by using a stroke sensor located within a suspension. Method C3: the control device 30 of the modified example detects the vibration of the tire 3A by using a sensor that detects a force applied to a sensor hub fitted to the wheel 3B of the vehicle wheel 3. Method C4: the control device 30 of the modified example detects the vibration of the tire 3A by using an acceleration sensor that detects the vibration of the tie rod 16.

The vehicle steering system 1 of the embodiment is configured as a column assist type electric power steering system. However, the configuration of the vehicle steering system 1 is not limited to the configuration exemplified in the embodiment. For example, the vehicle steering system 1 of a modified example is configured as one of a pinion assist type electric power steering system, a dual pinion assist type electric power steering system, a rack coaxial type electric power steering system, and a rack parallel type electric power steering system. In addition, the vehicle steering system 1 of another modified example is configured as a steer-by-wire electric power steering system in which a steering device connected to the steering component 2 is mechanically disconnected from a steered device that has the rack shaft 14, and changes the steered angle of the vehicle wheels 3.

What is claimed is:
1. A vehicle steering system comprising:
a sensor that detects a vibration of a vehicle wheel of a vehicle; and
a control device including a frequency analysis unit that resolves the vibration of the vehicle wheel detected by the sensor into a power spectrum at each predetermined frequency,
wherein the control device executes compensation assist control that suppresses at least one of a deflection of the vehicle and a vibration of a steering component of the vehicle that are caused by a puncture or a burst of the vehicle wheel, based on the vibration of the vehicle wheel that occurs in a specific frequency domain to distinguish between the vibration of the vehicle wheel caused by surface kickback and the vibration of the vehicle wheel caused by the puncture or burst of the vehicle wheel, the specific frequency domain being formed by a frequency range between a normal-vehicle frequency calculated based on a radius of the vehicle wheel when the vehicle wheel is normal and a traveling speed of the vehicle, and an abnormal-wheel frequency calculated based on a radius of the vehicle wheel when the vehicle wheel is punctured or burst and the traveling speed.

2. The vehicle steering system according to claim 1, wherein the control device executes the compensation assist control based on whether an integrated value of the power spectrum within the specific frequency domain is within a preset range.

3. The vehicle steering system according to claim 1, wherein the control device executes the compensation assist control based on whether a maximum value of the power spectrum within the specific frequency domain is equal to or larger than a preset threshold.

4. The vehicle steering system according to claim 1, wherein the control device executes the compensation assist control based on whether a shape of the power spectrum within the specific frequency domain is coincident with a shape of a power spectrum stored in advance.

5. The vehicle steering system according to claim 1, wherein the control device changes the specific frequency domain based on the traveling speed of the vehicle.

6. The vehicle steering system according to claim 1, wherein when the traveling speed of the vehicle is represented by V, the radius of the vehicle wheel when the vehicle wheel is normal is represented by R1, and the radius of the vehicle wheel when the vehicle wheel is punctured or burst is represented by R2, the normal-wheel frequency FQ1 is expressed by FQ1=V/2πR1, and the abnormal-wheel frequency FQ3 is expressed by FQ3=V/2πR2; and wherein the specific frequency domain is set to a domain that is equal to or higher than the normal-wheel frequency FQ1 and equal to or lower than the abnormal-wheel frequency FQ3.

* * * * *